(12) United States Patent
Zhang et al.

(10) Patent No.: US 7,540,886 B2
(45) Date of Patent: Jun. 2, 2009

(54) METHOD OF MANUFACTURING LITHIUM BATTERY

(75) Inventors: Ji-Guang Zhang, Atlanta, GA (US); Lonnie G. Johnson, Atlanta, GA (US); Steve Buckingham, Decatur, GA (US)

(73) Assignee: Excellatron Solid State, LLC, Atlanta, GA (US)

( * ) Notice: Subject to any disclaimer, the term of this patent is extended or adjusted under 35 U.S.C. 154(b) by 158 days.

(21) Appl. No.: 11/546,968

(22) Filed: Oct. 11, 2006

(65) Prior Publication Data

US 2009/0098281 A1  Apr. 16, 2009

Related U.S. Application Data

(60) Provisional application No. 60/725,683, filed on Oct. 11, 2005.

(51) Int. Cl.
*H01M 10/04* (2006.01)
(52) U.S. Cl. .................................... 29/623.3; 29/623.5
(58) Field of Classification Search ............... 29/623.1, 29/623.3, 623.5; 429/231.1, 231.3
See application file for complete search history.

(56) References Cited

U.S. PATENT DOCUMENTS

| 3,237,078 A | 2/1966 | Mallory |
| 3,393,355 A | 7/1968 | Whoriskey et al. |
| 4,040,410 A | 8/1977 | Libowitz |
| 4,049,877 A | 9/1977 | Sailant et al. |
| 4,092,464 A | 5/1978 | Dey et al. |
| 4,098,958 A | 7/1978 | Bettman |
| 4,303,877 A | 12/1981 | Meinhold |
| 4,422,500 A | 12/1983 | Nishizaki et al. |
| 4,523,635 A | 6/1985 | Nishizaki et al. |
| 4,562,511 A | 12/1985 | Nishino et al. |
| 4,614,905 A | 9/1986 | Petersson et al. |

(Continued)

FOREIGN PATENT DOCUMENTS

EP    0 168 062 A2    12/1981

(Continued)

OTHER PUBLICATIONS

Fragnaud et al.; Characterization of sprayed and sputter deposited LiCoO2 thin films for rechargeable microbatteries; (Journal of Power Sources 63 (1996) pp. 187-191).

(Continued)

*Primary Examiner*—Stephen J. Kalafut
(74) *Attorney, Agent, or Firm*—Baker Donelson

(57) ABSTRACT

A thin-film battery (10) is disclosed which includes a cathode current collector (11), a cathode (12), an electrolyte (13), an anode (14), and an anode current collector (15). The cathode is produced by grinding lithium cobalt oxide or other suitable cathode material to a powder having a mean particle size of between 5 and 12 microns, forming a liquid slurry with the cathode material, casting the liquid slurry upon a substrate, drying the liquid slurry to form a layer of cathode material, and compressing the cathode layer to a generally uniform and smooth thickness of between 5 and 12 microns. The compressed layer is then heated to a temperature which sinters or melts the peripheral edges of the cathode particles together.

13 Claims, 14 Drawing Sheets

U.S. PATENT DOCUMENTS

| | | | |
|---|---|---|---|
| 4,654,281 A | 3/1987 | Anderman et al. | |
| 4,677,038 A | 6/1987 | Salomon | |
| 4,692,390 A | 9/1987 | Roy | |
| 4,719,401 A | 1/1988 | Altmejd | |
| 4,744,936 A * | 5/1988 | Bittner, Jr. | 264/175 |
| 4,781,029 A | 11/1988 | SerVaas | |
| 4,818,638 A | 4/1989 | Roy | |
| 5,139,895 A | 8/1992 | Roy et al. | |
| 5,270,365 A | 12/1993 | Hoffman et al. | |
| 5,291,116 A | 3/1994 | Feldstein | |
| 5,306,577 A | 4/1994 | Sprouse | |
| 5,314,765 A | 5/1994 | Bates | |
| 5,336,573 A | 8/1994 | Zuckerbrod et al. | |
| 5,338,625 A | 8/1994 | Bates et al. | |
| 5,358,801 A * | 10/1994 | Brodd | 429/215 |
| 5,362,581 A | 11/1994 | Chang et al. | |
| 5,387,857 A | 2/1995 | Honda et al. | |
| 5,436,091 A | 7/1995 | Shackle et al. | |
| 5,445,906 A | 8/1995 | Hobson et al. | |
| 5,455,126 A | 10/1995 | Bates et al. | |
| 5,498,489 A | 3/1996 | Dasgupta et al. | |
| 5,512,147 A | 4/1996 | Bates et al. | |
| 5,518,839 A * | 5/1996 | Olsen | 429/231.3 X |
| 5,532,074 A | 7/1996 | Golben | |
| 5,540,741 A | 7/1996 | Gozdz et al. | |
| 5,547,782 A | 8/1996 | Dasgupta et al. | |
| 5,561,004 A | 10/1996 | Bates et al. | |
| 5,567,210 A | 10/1996 | Bates et al. | |
| 5,569,520 A | 10/1996 | Bates | |
| 5,571,634 A | 11/1996 | Gozdz et al. | |
| 5,584,893 A | 12/1996 | Mitchell | |
| 5,588,971 A | 12/1996 | Fauteux et al. | |
| 5,591,544 A | 1/1997 | Fauteux et al. | |
| 5,597,659 A | 1/1997 | Morigaki et al. | |
| 5,597,660 A | 1/1997 | Bates et al. | |
| 5,612,152 A | 3/1997 | Bates | |
| 5,654,084 A | 8/1997 | Egert | |
| 5,778,515 A | 7/1998 | Menon | |
| 5,783,928 A | 7/1998 | Okamura | |
| 5,811,205 A | 9/1998 | Andrieu et al. | |
| 5,821,733 A | 10/1998 | Turnbull | |
| 5,846,673 A * | 12/1998 | Saidi et al. | 29/623.1 X |
| 5,928,436 A | 7/1999 | Borkowski et al. | |
| 6,001,139 A | 12/1999 | Asanuma et al. | |
| 6,033,796 A | 3/2000 | Baji | |
| 6,194,098 B1 * | 2/2001 | Ying et al. | 429/231.1 X |
| 6,217,623 B1 * | 4/2001 | Reichert et al. | 29/623.5 |
| 6,709,778 B2 | 3/2004 | Johnson | |
| 6,737,180 B2 | 5/2004 | Johnson | |
| 6,846,592 B2 * | 1/2005 | Kweon et al. | 29/623.5 X |
| 6,933,078 B2 * | 8/2005 | Huang et al. | 29/623.1 X |

FOREIGN PATENT DOCUMENTS

| | | |
|---|---|---|
| EP | 0 055 855 | 7/1982 |
| EP | 0 071 271 | 2/1983 |
| EP | 0 168 062 B1 | 1/1986 |
| EP | 999604 A1 * | 5/2000 |

OTHER PUBLICATIONS

Wang et al.; Characterization of Thin-Film Rechargeable Lithium Batteries with Lithium Cobalt Oxide Cathodes; (J. Electrochem. Soc., vol. 143, No. 10, Oct. 1996, pp. 3203-3213).

Fragnaud et al.; Thin-film cathodes for secondary lithium batteries; Journal of Power Sources 54 (1995) no month pp. 362-366.

Kenny et al.; The preparation and characterization of lithium cobalt oxide thin films by LPCVD; Materials Research Society vol. 415 (1996) no month pp. 213-217.

Schoonman et al.; Thin film solid electrodes for rechargeable lithium-ion batteries; Journal of Power Sources 68 (1997) no month pp. 65-68.

Chen et al.; Fabrication of LiCoO2 thin film cathodes for rechargeable lithium better by electrostatic spray pyrolysis; Solid State Ionics 80 (1995) no month pp. 1-4.

Chen et al.; Unique porous LiCoO2 thin layers prepared by electrostatic spray deposition; Journal of Materials Science 31 (1996) no month pp. 5437-5442.

Cole, Terry; Thermoelectric Energy Conversion with Solid Electrolytes; Science vol. 221 Sep. 2, 1983, pp. 915-920.

Feldman et al.; Heat pumps using organometallic liquid absorbents; AES-vol. 38, 1998 no month pp. 403-407.

Oxidation-Reduction Reactions; pp. 417-420.

* cited by examiner

US 7,540,886 B2

METHOD OF MANUFACTURING LITHIUM BATTERY

REFERENCE TO RELATED APPLICATION

This is a continuation-in-part of U.S. Patent Application Ser. No. 60/725,683 filed Oct. 11, 2005.

TECHNICAL FIELD

This invention relates to a method of manufacturing a lithium battery, and specifically to a method of manufacturing thin film lithium and lithium ion batteries.

BACKGROUND OF THE INVENTION

In recent years, rapid development of electronic devices has greatly outpaced advances in battery technology. As a result, batteries today require a higher power density, a high cycle life, a wide2 operating temperature range, a more rapid recharge capability and increased power densities.

Accordingly, it is seen that a need exists for a battery that provides higher power density, a high cycle life, a wide operating temperature range, a rapid recharge capability and increased power densities. A low cost production method is important for large scale production of such a high performance battery. It is to the provision of such therefore that the present invention is primarily directed.

DETAILED DESCRIPTION

Figure 1:
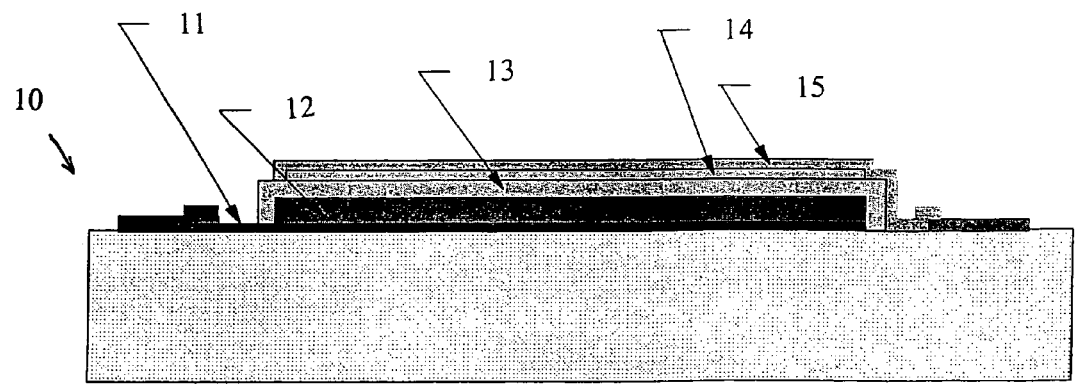
FIG. 1 is a schematic cross-section of a battery produced in accordance with a preferred form of the invention.

The battery components of the present invention are conventionally oriented, as shown in U.S. Pat. Nos. 6,835,493 and 5,597,660 which are specifically incorporated herein. Thin-film solid-state batteries are constructed by depositing the components of the battery as thin films (less than 5 μm) on a substrate. The typical structure of a thin-film solid-state battery is illustrated in the schematic cross section shown in FIG. 1.

The thin-film battery 10 includes a cathode current collector 11, a cathode 12, an electrolyte 13, an anode 14, and an anode current collector 15. The cathode and anode current collectors are deposited by sputtering or other suitable physical or chemical deposition techniques. Cathode films of lithium cobalt oxide or other similar composition ($LiCoO_2$ or $LiMn_2O_4$) are typically deposited by RF magnetron sputtering of sintered targets of the respective compounds in $Ar+O_2$ while films of $V_2O_5$ are deposited by reactive sputtering of V in $Ar+O_2$ The electrolyte 13 may be a sputtered LiPON electrolyte film which covers the cathode and a portion of the substrate up to the anode current collector in order to insulate the substrate from direct contact with the anode. The anode can be either lithium metal or other lithium intercalation compounds, such as $Sn_3N_4$. The battery may also include a sealing layer.

Applicant has discovered that to reduce the production cost of high power thin film batteries, which are normally manufactured by vacuum technology, a hybrid approach may be utilized. In this approach, $LiCoO_2$ powder is cast on a thin metal substrate by a wet slurry coating method. A solid-state electrolyte, LiPON film, is deposited on top of the cast cathode film by conventional sputtering methods. Microscopic analysis indicates that the LiPON has good coverage of the cathode film. After LiPON electrolyte deposition, a lithium anode is deposited on top of LiPON electrolyte by conventional thermal evaporation in a glove box to complete the cell.

Commercially available $LiCoO_2$ powders have a mean particle size of 5-10 µm. These data indicate that lithium ions can diffuse through a distance of 5-10 µm inside of the $LiCoO_2$ particle in the absence of electrolyte. Therefore, very thin $LiCoO_2$ films (5-10 µm thick) are desired. Commercially available $LiCoO_2$ powder has a wide size distribution with the largest particles about 20 µm. To cast a 5-10 µm thick film, commercially available $LiCoO_2$ powder must be ground to an average particle size of approximately 5 µm. Large particles cannot be smoothly cast into a 5 um thick film and too small a particle size will lead to increased cathode impedance due to particle to particle resistance. Another important factor is that the cathode film should be extremely smooth so that a thin LiPON film (~2 mm thick) can cover it without pinholes. The desired smoothness of the cathode films is achieved by rolling through a stainless roller under high pressure before LiPON deposition. Once the cathode film is rolled, it is heated. The very thin films (5-10 µm thick) are annealed at a temperature of between 250 and 800° C.

Figure 2:
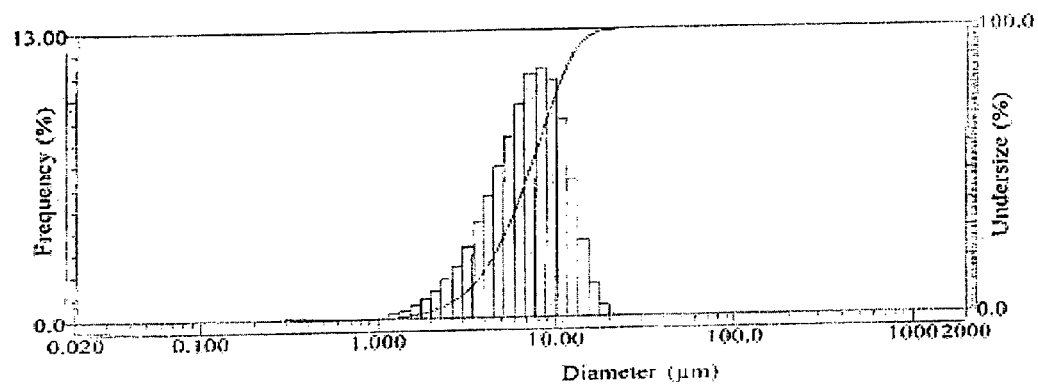
FIG. 2 is a graph showing the size distribution of the cathode material prior to grinding.
Figure 3:
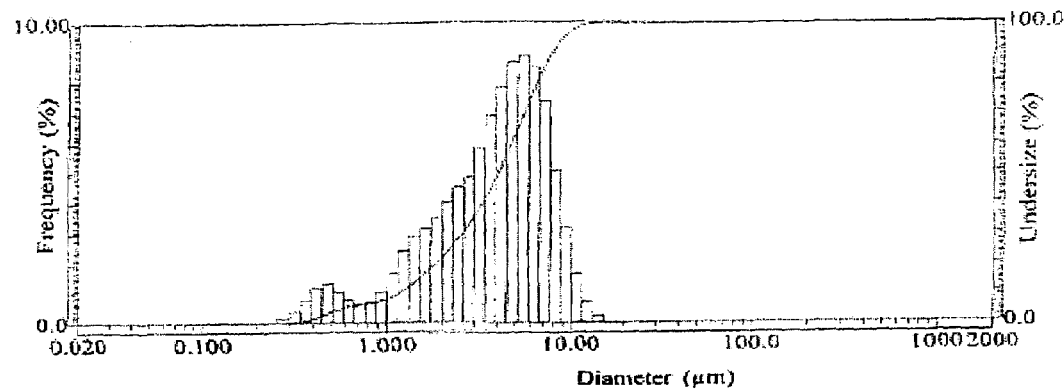
FIG. 3 is a graph showing the size distribution of the cathode material after one hour of grinding.
Figure 4:
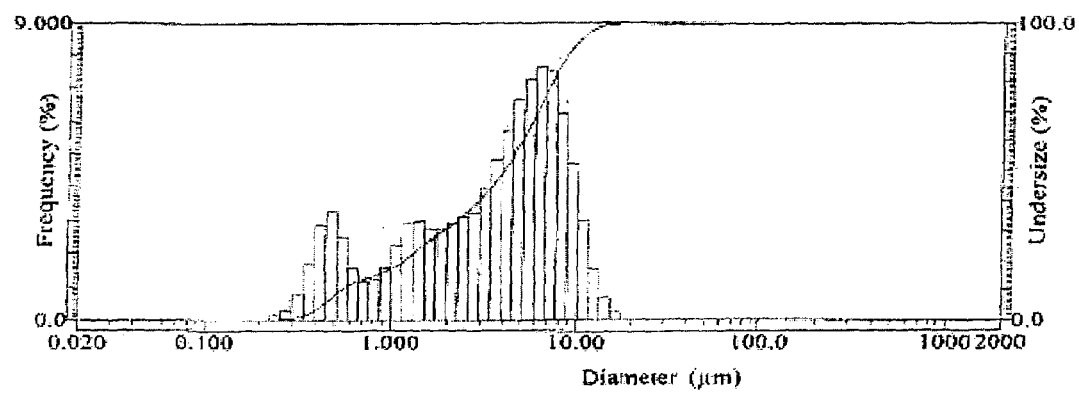
FIG. 4 is a graph showing the size distribution of the cathode material after three hours of grinding.

To prepare the lithium cobalt oxide powder used in the present invention, lithium cobalt oxide is ground using a PM100 planetary ball mill with an isopropyl alcohol (IPA) used as the wetting agent. Experimentation was performed on 200 g of $LiCoO_2$ powder (approximately 80 ml), 45 ml IPA, and 70 ml $ZrO_2$ balls (3 mm in diameter) placed in a 250 ml $ZrO_2$ jar and spun at a grinding speed of 450 RPM. FIG. 2 shows the particle size distribution of $LiCoO_2$ powder before grinding. The average particle size is 7.42 µm. The largest particle size is 22.79 µm. However, after one hour of grinding the particle size distribution resulted in the average particle size of 4.32 µm with the maximum particle size reduced to 15.17 µm, as shown in FIG. 3. However, a further increase of grinding time did not lead to a significant reduction of particle size, as shown in FIG. 4 which shows the particle size distribution after three hours of grinding. The summary of the testing results is shown in Table 1. It is clear that the particle size is basically the same after one hour and three hours of grinding. In other words, particle size has reached its minimum after one hour of grinding.

TABLE 1

Comparison of particle sizes before and after grinding

| Condition # | MV | D50 | 100%< |
|---|---|---|---|
| Starting sample | 7.42 | 7.06 | 22.79 |
| Sample 1 (after 1 hour) | 4.32 | 4.04 | 15.17 |
| Sample 2 (after 3 hrs) | 4.40 | 4.02 | 17.37 |

Figures 5A, 5B:
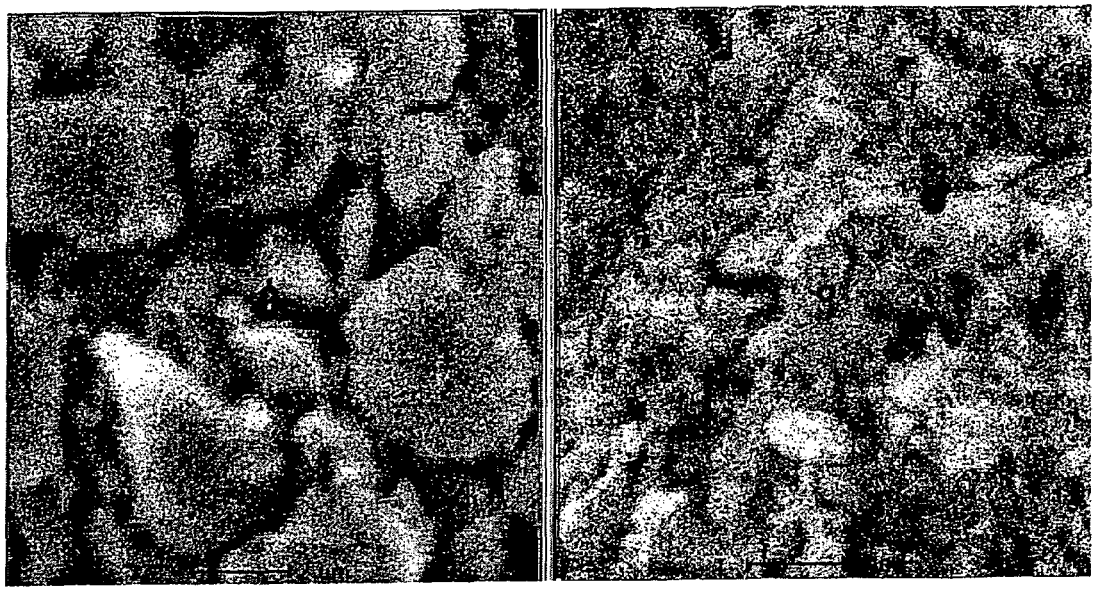
FIG. 5a is a copy of a photograph showing the cathode particles.
FIG. 5b is a copy of a photograph showing the cathode particles.
Figures 6A, 6B:
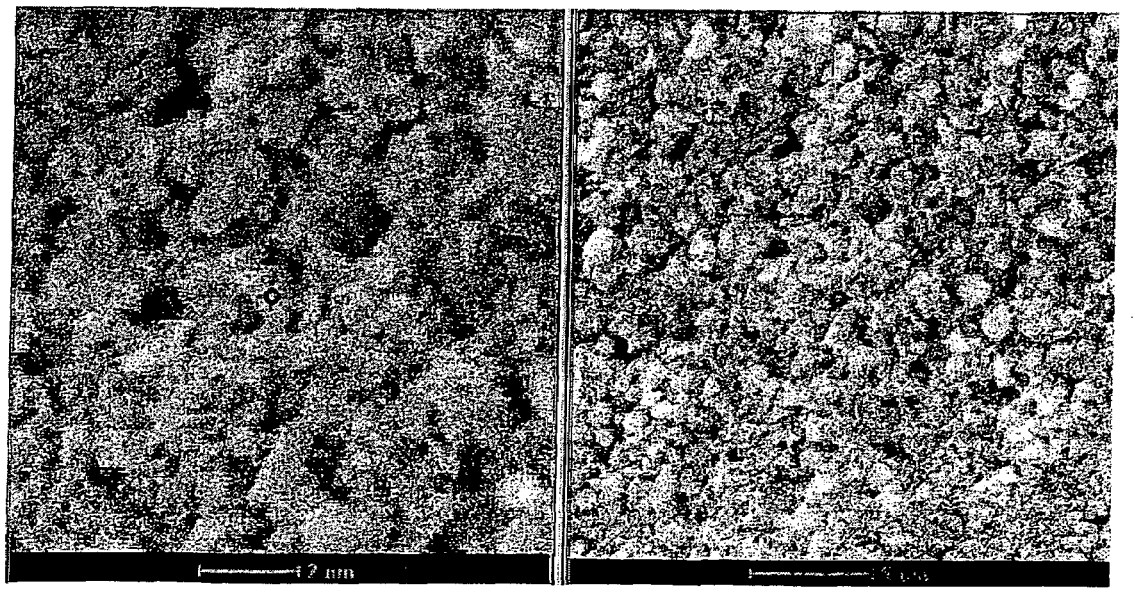
FIG. 6a is a copy of a photograph showing the cathode particles.
FIG. 6b is a copy of a photograph showing the cathode particles.

The ball mill process can significantly increase the population of smaller particles. However, these smaller particles have to be separated from large particles before they can be used to cast a smooth film. A centrifuge is used to separate smaller $LiCoO_2$ particles from the larger ones. An Accuspin 400 centrifuge (Thermal Electric) has been used to accomplish this task. Applicant conducted the following experimentation, 40 g of particle slurry ($LiCoO_2$:IPA weight ratio=200: 45) from the milling process (after two hours milling) was diluted with 320 ml of distilled water, then centrifuged at 300 rpm for eight minutes to separate the particles. After centrifuging, the smaller particles remain in solution while the larger particles deposit on the bottom of the centrifuge tube. About 80% volume of the fluid with small particles suspended (larger particles deposited at the bottom of the test tube) was poured from the centrifuge tube. The smaller particles were recovered by heating to remove water and IPA in the slurry. The SEM images shown in FIG. 5 indicate that the centrifuging method can effectively separate different particles. FIG. 5*a* shows the particles left at the bottom of the tubes. These particles are larger than approximately 7 µm. FIG. 5*b* shows the particles poured from top of the tube. The majority of these particles appear to be less than 1 µm. High-resolution SEM pictures of particle size distribution are shown in FIG. 7. FIG. 6(*a*) is an SEM picture under 10,000 times magnification. FIG. 6(*b*) is an SEM picture with 5,000 times magnification. The figures clearly show that the particle sizes are smaller than one µm.

A method has been developed to select $LiCoO_2$ powders with a small band width, i.e., a small particle distribution range. The newly acquired $LiCoO_2$ powder with a mean particle size of 10 µm was used. First, the powder is mixed with alcohol. The powder/alcohol mixture is ultrasonically treated to separate the particles and then shaken briefly to mix them. The solution is then allowed to settle for 1 minute to allow the larger particles to sink to the bottom. The smaller particles remaining suspended in the solution are then poured off thereby leaving the larger particles deposited at the bottom.

Figures 7A, 7B:
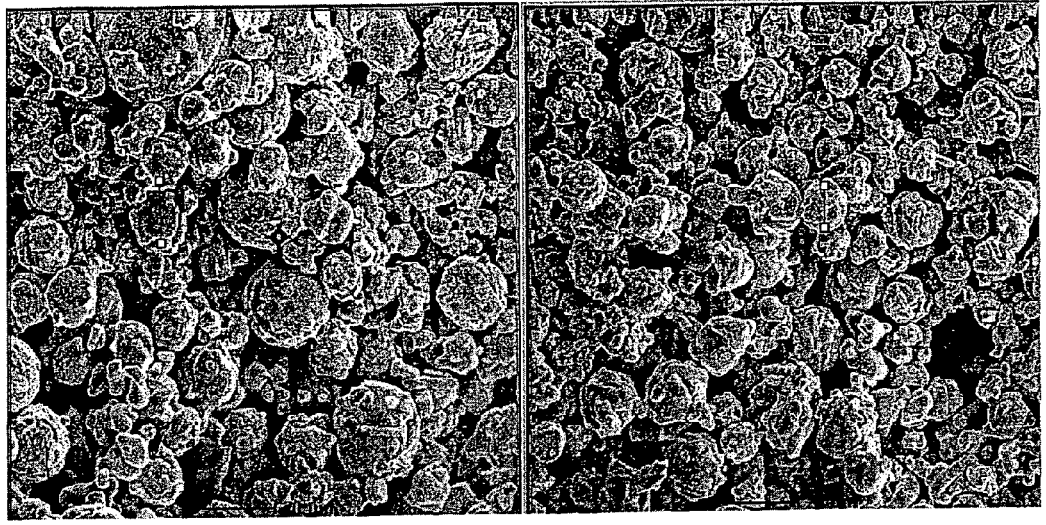
FIG. 7a is a copy of a photograph showing the cathode particles.
FIG. 7b is a copy of a photograph showing the cathode particles.

FIG. 7*a* shows an SEM image of these particles with sizes from approximately 5 µm to 30 µm in size.

The container containing the solution is then refilled with alcohol and ultra-sonicated and shaken again. It was again allowed to settle in the same way as for the first part of the experiment. However, this time the smaller particles in solution were poured off and the large particles in the bottom of the tube were discarded. Now particles above 5-12 µm in size have been selected as shown in FIG. 7(*b*).

In general, the films prepared with fine powder (<1 µm) exhibit a shiny (mirror like) surface after rolling. However, all the films prepared with fine powder gave very high cell resistance, which may be due to the multi-layers of particles in the film. It seems that Li ions only have good access to the top layer of the $LiCoO_2$ particles. If this layer of $LiCoO_2$ particles also has direct contact to the substrate, then the sample will have good ionic and electronic conductivity. If this layer of $LiCoO_2$ particles has no direct contact to the substrate and Li ions have to diffuse through multiple particles, then the multiple interfaces between particles cause the resulting cells to exhibit a high impedance.

Figures 8A, 8B, 8C:
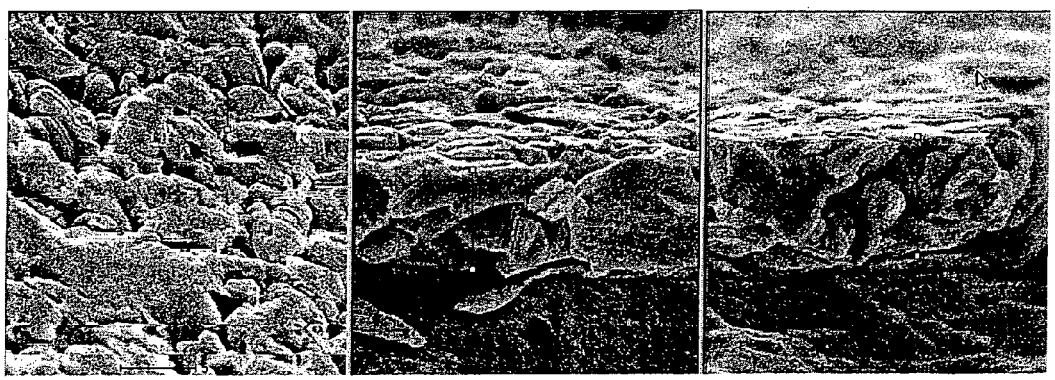
FIG. 8a is a copy of a photograph showing the cast cathode layer.
FIG. 8b is a copy of a photograph showing the cast cathode layer.
FIG. 8c is a copy of a photograph showing the cast cathode layer.

Once the cathode material is dried, the powder is collected and used to make a casting solution by mixing in a 95:5 ratio with PVA binder. The slurry is mixed for 2 hours and given a 5-minute ultra sonic bath. The casting solution or slurry is then cast using a 1 mil doctor blade gap. After drying, the films are rolled under high pressure. The SEM cross section of the cast layer is shown in FIG. 8. The layer thickness is preferably approximately 7 µm. FIG. 8 shows the surface of cast and rolled single $LiCoO_2$ particle layer and two cross section images showing 6.5-7.5 um layer thickness.

Initial cells using cast $LiCoO_2$ cathode show capacity fade and charge coefficients that are inferior to sputtered $LiCoO_2$. This may be due to stress in the annealed cast cathode causing cracks in the layer during the charge/discharge process which produces additional stress due to the approximately 3-5% expansion/contraction in the cathode. To eliminate this problem, several different substrates have been used that have significantly different thermal expansion coefficients (CTE)

in hopes of tailoring the initial stress in the $LiCoO_2$ layer to produce the best performance.

A stainless steel (SS) substrate seems to perform best with regard to oxidation of the metal. A cell annealed at a very high temperature (800° C.) shows a very high capacity but large fade in the first 10 to 15 cycles. Capacity was around 170 to 150 μAh after the first a few cycles with only a 0.36 cm² active area.

Several substrates, including 2 mil thick nickel, Au/Co coated 2 mil thick nickel, Au/Co coated 0.5 mil thick nickel, 2 mil and 4 μm thick Al foils have been further investigated. Among these substrates, 2 mil thick nickel and Au/Co coated 2 mil thick nickel gave the best adhesion. Nickel substrate was treated at 700° C. for one hour to form a thin layer (approximately 2 microns) of insulation layer (NiO) before coated with 200 angstroms of Co and 2000 angstroms of Au. The tape tests after 500 annealing showed that the films prepared on a thicker Ni substrate (2 mil thick) were less powdery than those prepared on 0.5 mil thick Ni substrate. $LiCoO_2$ deposited on a thick substrate may have a better particle to substrate binding. The micro-wrinkles of the thinner substrates formed during the casting process may destroy the integrity of the $LiCoO_2$ layer during the annealing process.

Although the cathode will lose its integrity if it is annealed at more than 250° C. because of loss of binder, annealing at higher temperature (>500° C.) will result in sintering of the cathode and cathode powders may be bound together by sintering instead of by binder, preferably the powder is sintered so that just its peripheral edges sinter or melt with the peripheral edges of adjoining particles, i.e., that the edges melt together rather than the entirety of the powders melting and thereby forming a solid dense material.

Figure 9:
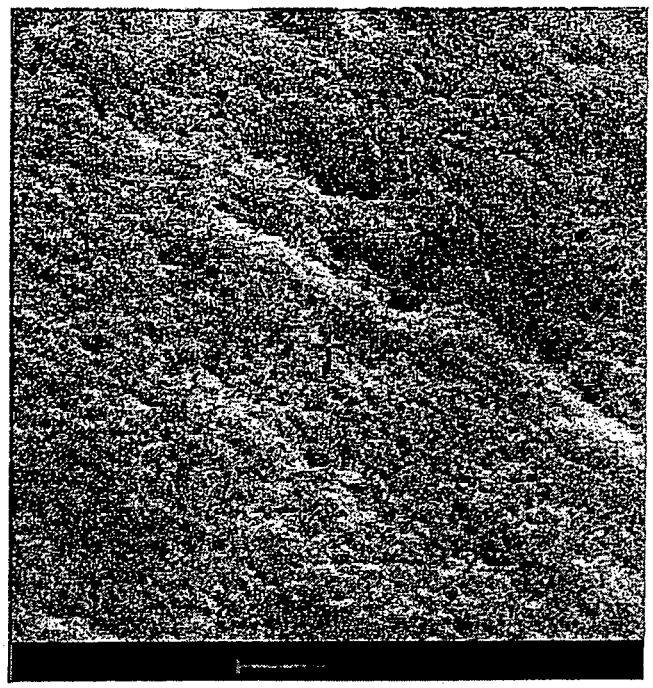
FIG. 9 is a copy of a photograph showing the cast cathode layer after being annealed.

In this effort, $LiCoO_2$ samples were cast on Au/Co coated Nickel or Al substrate, annealed at 550° C. for 6 hours, then coated with LiPON and lithium to complete the cell. These samples have demonstrated reasonable electrochemical performance. Similar samples were also annealed at 700 and 800° C., however, these samples show a much faster capacity fade, which can be attributed to cracking/loss of contact during the charge/discharge process. The SEM picture shown in FIG. 9 reveals the surface morphology of a cast $LiCoO_2$ annealed to 750° C. for 30 minutes on Co/Au/Ni foil (2 mil).

Figure 10:
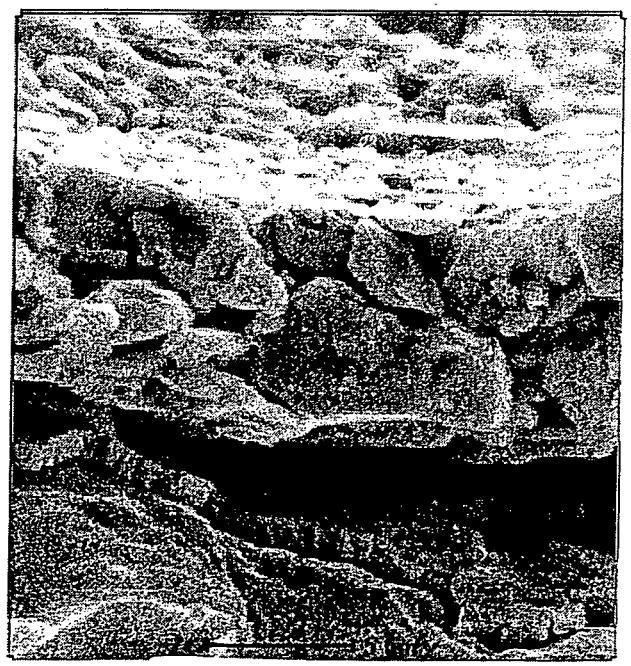
FIG. 10 is a copy of a photograph showing the cast cathode layer after being annealed.

A cast layer of $LiCoO_2$ with 1% binder was annealed to 550° C. for 5 hours. Although the sample showed some powdery nature when rubbed it appeared to be smooth and the layer was not flaking off. LiPON and Li were deposited and the cell cycled at 25 μA. It showed good cyclability and reasonable capacity. The C-rate capacity of 27 μAh is for an active area of 0.36 cm². This cast cell has a thickness of approximately 5-10 um and is cast from a mixture of fine (<1 um) and regular powder (approximately 7 um). The cross section of the cell is shown in FIG. 10. (The layer was lifted from the Al foil substrate during the tearing of the foil to produce the cross section). The sample capacity loss is minimal when cycling at C-rate.

Figure 11:
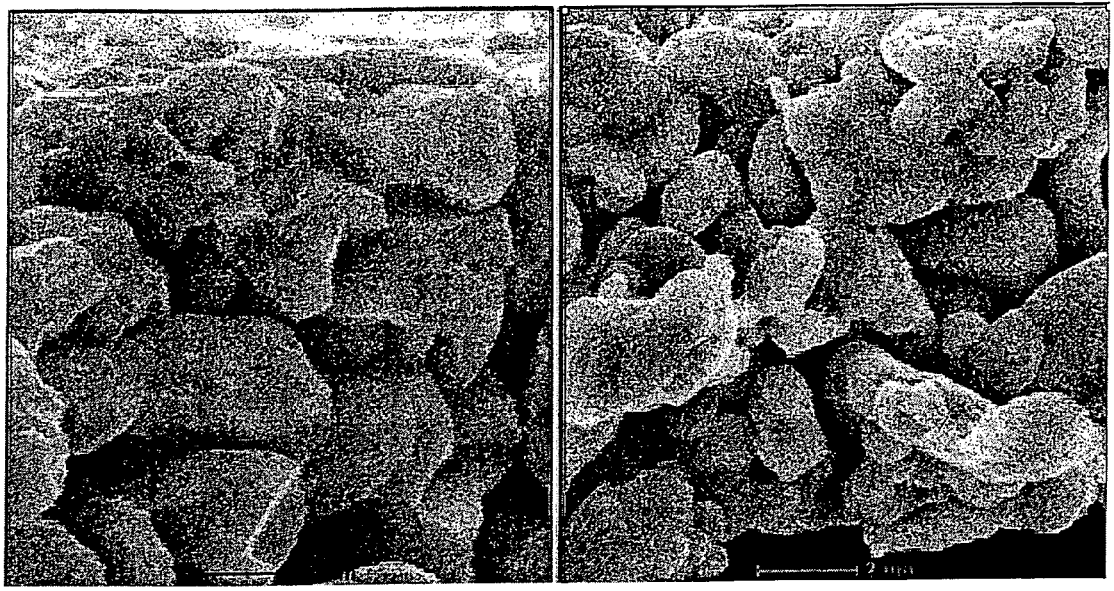
FIG. 11 is a copy of a photograph showing the cast cathode layer after being annealed.
Figure 12:
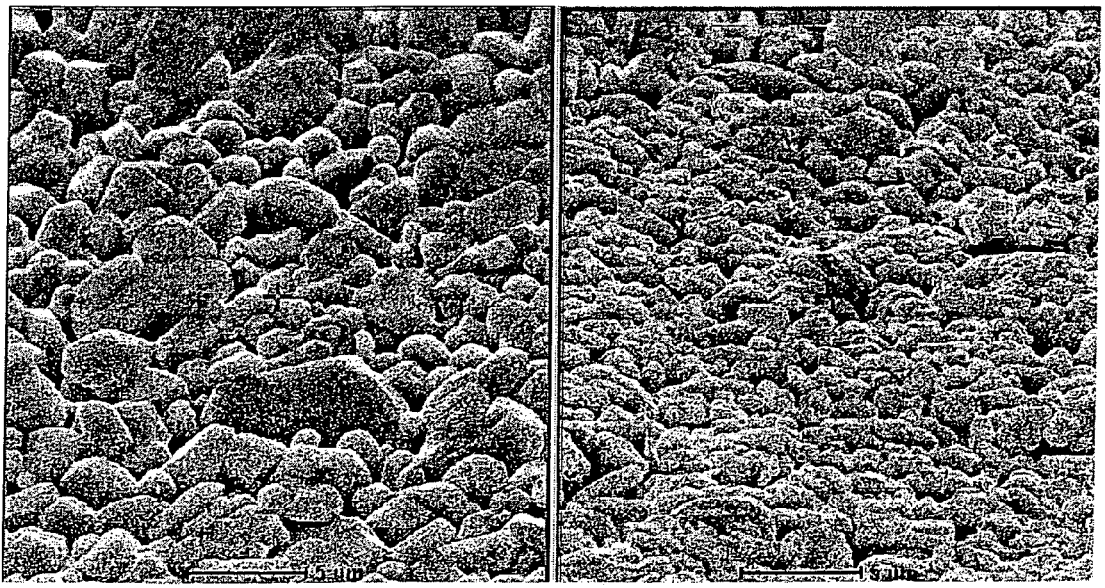
FIG. 12 is a copy of a photograph showing the cast cathode layer after being annealed.

The temperature/time combination used for the sample above (550° C. for 5 hours) is insufficient to fully sinter or connect the individual particles within the cast layer. More tests have been done to increase cathode annealing temperature in an effort to achieve a better inter-particle adhesion. Initial test samples were annealed to 850° C. and 950° C. for 16 hours. The images in FIGS. 11 and 12 show a comparison of the cast layers annealed to 950° C. (left) and 850° C. (right). FIG. 11 shows the cross section of the samples and FIG. 12 shows the top surface of the samples. The images show that the 950° C. annealing has caused the particles to coalesce more than the 850° C. anneal. After annealing at 850° C. for 16 hrs, Co/Au current collector remains intact and conductive. However, annealing at 950° C. for 16 hours resulted in high impedance for Co/Au cathode current collector. Tests on the Co/Au layer show that it remains conductive following annealing to 900° C. for up to 5 hours and tests for longer durations are ongoing.

Annealing temperature is an important factor in preparation of a casting film. At a temperature less than 250° C., $LiCoO_2$ particles can be bound together by a binder, but the high impedance of the binder (which is an ionic and electronic insulator) will lead to high impedance of the resulting cells. At a temperature of more than 800° C., $LiCoO_2$ powder is sintered together. However, it is difficult to find an economical, flexible substrate that does not oxidize at more than 800° C. At a temperature between 250 and 800° C., the binder will be decomposed and/or evaporated. The higher the temperature, the faster the binder is removed. At a temperate of 550° C., PVA (water based), PVB (alcohol based) and LHB-108P (water based, LiCo Tech Corp, Taiwan) will be almost totally decomposed and/or evaporated in approximately 6 hours. This temperature also limits the oxidation of Au/Co coated nickel substrate. Therefore, annealing at 550° C. for 6 hours has been used.

In general, thicker $LiCoO_2$ films tend to exhibit poor bonding and look powdery after annealing. Even if the surface looks smooth after rolling, the surface layer can be easily peeled off by Scotch tape and the underneath film is very powdery. These films also lead to a high resistance cells. This is consistent with the previous analysis on the fine powder because a thick film has to rely on multiple particle-particle contacts to conduct ions and electrons. These multiple interfaces will significantly increase cell resistance.

Figure 13:
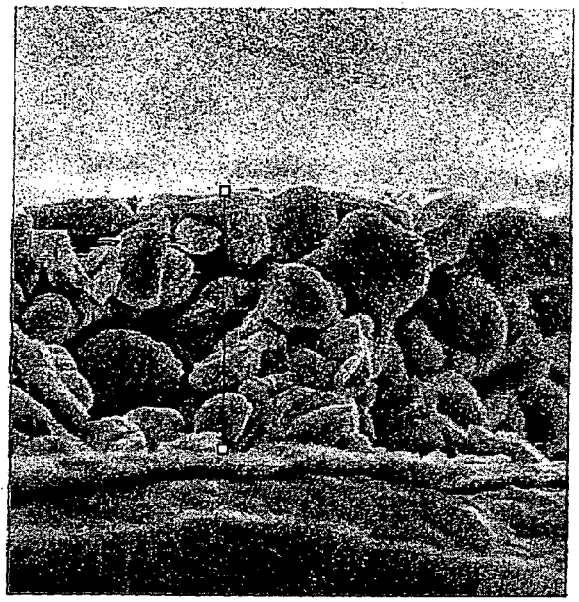
FIG. 13 is a copy of a photograph showing the cast cathode layer after being annealed.

Additional samples have been prepared and annealed at 250° C. Sample C119 used cathode with a $LiCoO_2$:PVA (polyvinyl alcohol) ratio of 95:5 where $LiCoO_2$ has a narrow particle distribution (5-12 um). C120 used cathode with a $LiCoO_2$:PVA ratio of 95:5 ratio where the $LiCoO_2$ was large powder (average particle size of 10 um with a wide size distribution) as manufactured (not separated), and C121 was original (7 um) powder mixed with milled and separated fine powder. All of the C120 samples failed after LiPON deposition. The cast layer separated and the LiPON peeled off. Experiments have shown that layers thicker than 7-8 um usually fail in this way. The substrate-particle bond is strong and the particle-LiPON bond is strong, but the particle-particle bond within the layer is much weaker. As the cast layer thickness increases more particle-particle bonding is required to hold the full layer together as fewer particles span the full distance from the substrate to the LiPON. The deposited LiPON film adds a large compressive stress to the multilayer system, which can separate the cast layer causing delamination of the LiPON. SEM analysis on the cross section of sample C120 revealed that the film was 10-11 um thick (see FIG. 13).

Figures 14A, 14B:
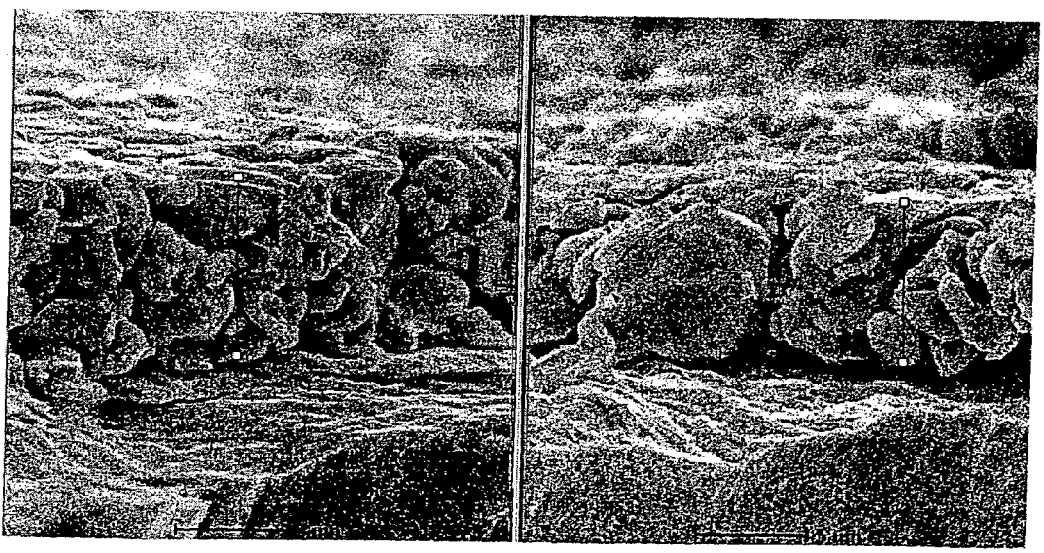
FIG. 14a is a copy of a photograph showing the cast cathode layer after being annealed.
FIG. 14b is a copy of a photograph showing the cast cathode layer after being annealed.

Sample C119 was cast on Ni coated 2 mil Al foil (C119a) and 1 mil pure Ni foil (C119b). FIG. 14 shows a representative SEM cross section of these samples. C119a has a cathode thickness of 8 um. C119b has thickness of 7 m. The reason for the slightly thinner layer on the Ni foil despite similar casting and rolling conditions is that the Ni foil is harder and thinner allowing for less depression or cushioning in the rolling process.

Figures 15A, 15B:
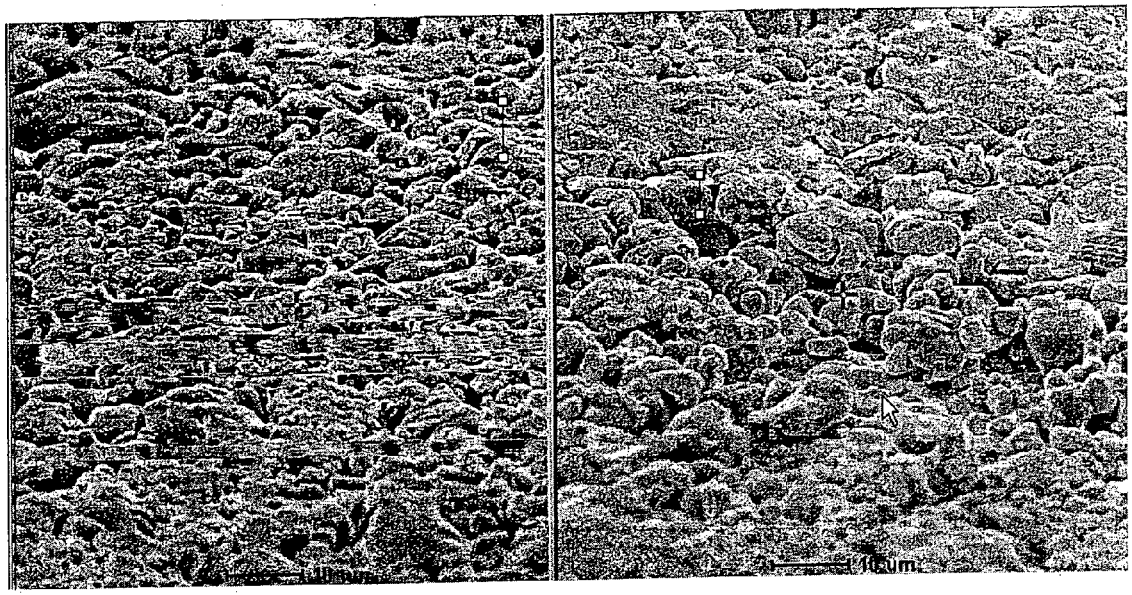
FIG. 15a is a copy of a photograph showing the cast cathode layer after being annealed.
FIG. 15b is a copy of a photograph showing the cast cathode layer after being annealed.

Although the images above show that the cathode layer on 1 mil Ni foil is more compressed, a comparison of the images of samples C119a and C119b surfaces (see FIG. 15) reveals that there is less adhesion of the particles to the Ni foil than to the Ni coated Al foil. This can be seen from the voids in the Ni foil cast film shown in FIG. 15(*b*), the voids are caused by missing particles. The voids are extensive across the layer and in many cases they are deep enough to expose the foil surface. This makes it almost impossible to achieve complete insulating coverage using just a 2 u m thin film of LiPON electrolyte.

Figure 16:
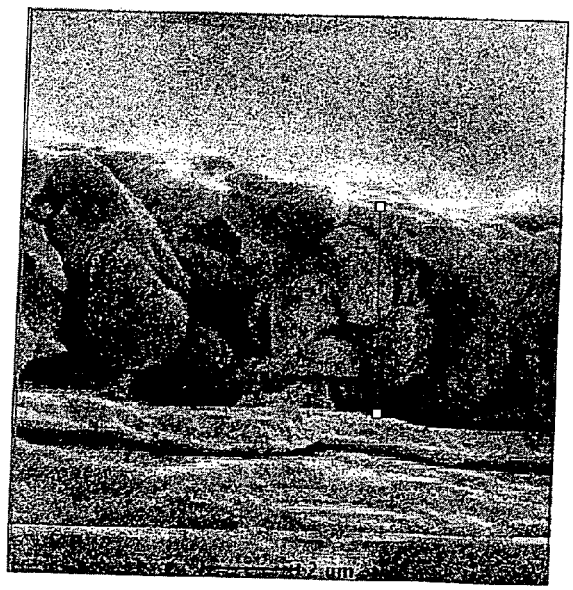
FIG. 16 is a copy of a photograph showing the cast cathode layer after being annealed.

The C121b samples were cast using a 2-mil gap to thicken the film. The cross section is shown in FIG. 16 indicating a layer thickness of only 4 um.

Figure 17:
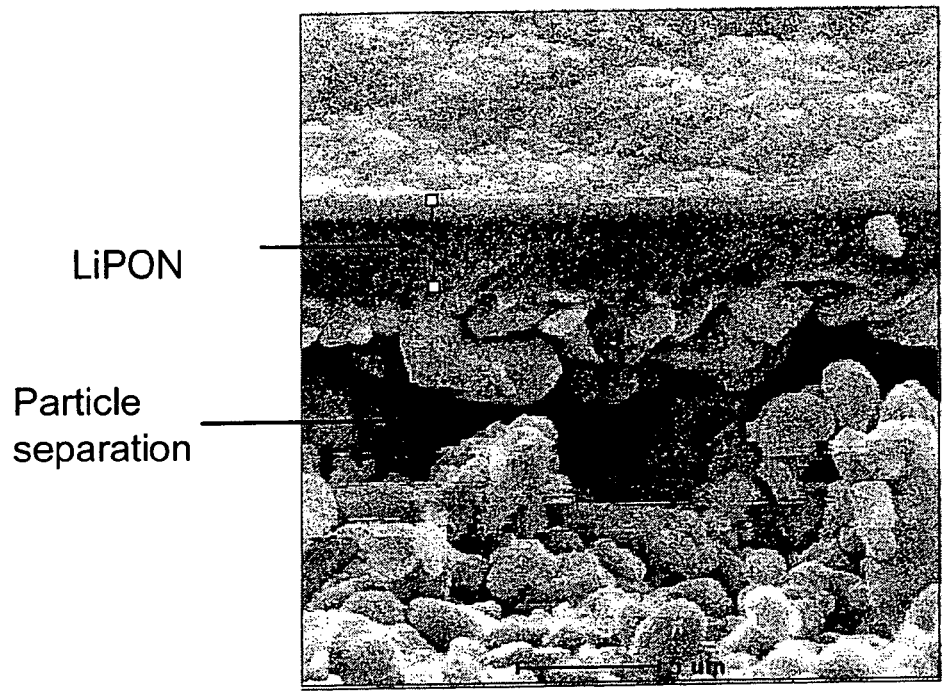
FIG. 17 is a copy of a photograph showing the cast cathode layer after being annealed, illustrating delamination.

In order to increase the energy density of the cells, it is desirable to either decrease the foil substrate thickness or increase the $LiCoO_2$ thickness. Samples were produced on the same substrate using increased gap sizes for casting, giving cathodes of 10-12 u m (after rolling). Although these layers showed excellent adhesion based on tape tests, the samples delaminated after the LiPON deposition. The delamination occurred "within" the cast $LiCoO_2$ layer as shown in FIG. 17. Particles are adhered under the LiPON film and to the substrate surface (not visible through the particles in the lower half of the image) and have clearly separated "within" the $LiCoO_2$ layer itself.

Figures 18A, 18B:
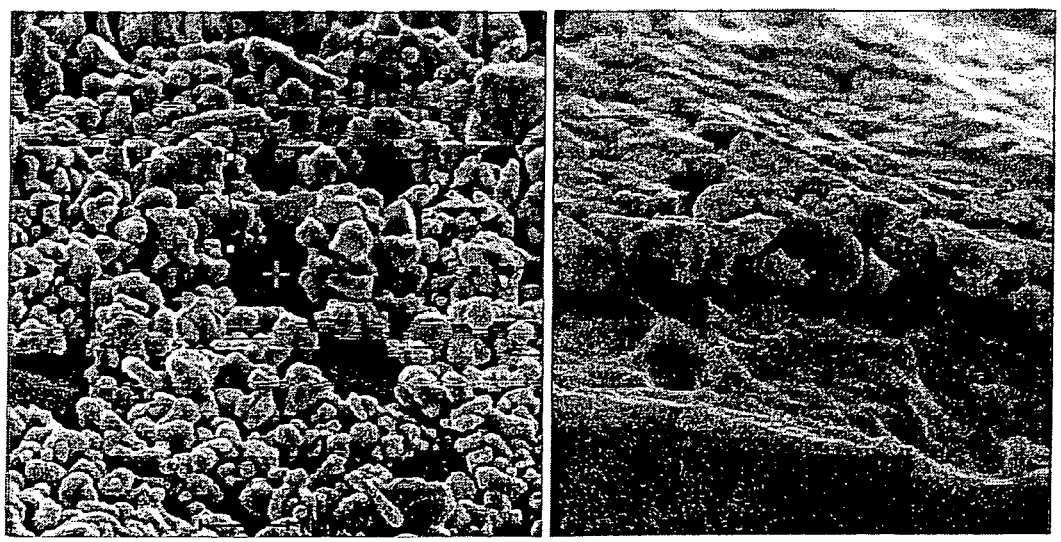
FIG. 18a is a copy of a photograph showing the cast cathode layer after being annealed.
FIG. 18b is a copy of a photograph showing the cast cathode layer after being annealed and rolled.

A method has been developed to prepare ultra thin cathode films (a single layer). The concentration of the cathode slurry, casting gap, and speed were carefully controlled to cast cathode film with minimum thickness but still have a good coverage of the whole substrate. A typical casting condition is: ratio of $LiCoO_2$:PVA=98:/2, ratio of solid to liquid (water) approximately 1:2. The casting gap was 1 mil and the casting speed is 5 mm/sec). The as-cast film does not have full coverage of the substrate as shown in FIG. 18. FIG. 18 (*a*) shows the SEM picture of as-cast $LiCoO_2$ on Al foil which does not have full coverage of the substrate. FIG. 18(*b*) shows the SEM picture of $LiCoO_2$ films after compressing between stainless rollers. The film shows a much better coverage of the substrate after rolling. Al foil deforms to fit the shape of the $LiCoO_2$ particles.

It has been observed that Ni(0.3 um) coated Al foil (normally 2 mil thick) performs much better than Al foil alone or joining adhesive (such as Adcote a registered trademark of Rohm & Haas Chemicals, LLC) coated Al foil. Also, Ni coated Al foil, annealing to 350° C. for 1 hr or to 450° C. for 1 hour decreases the impedance from ~5 kohms to 300-600 ohms.

Figure 19:
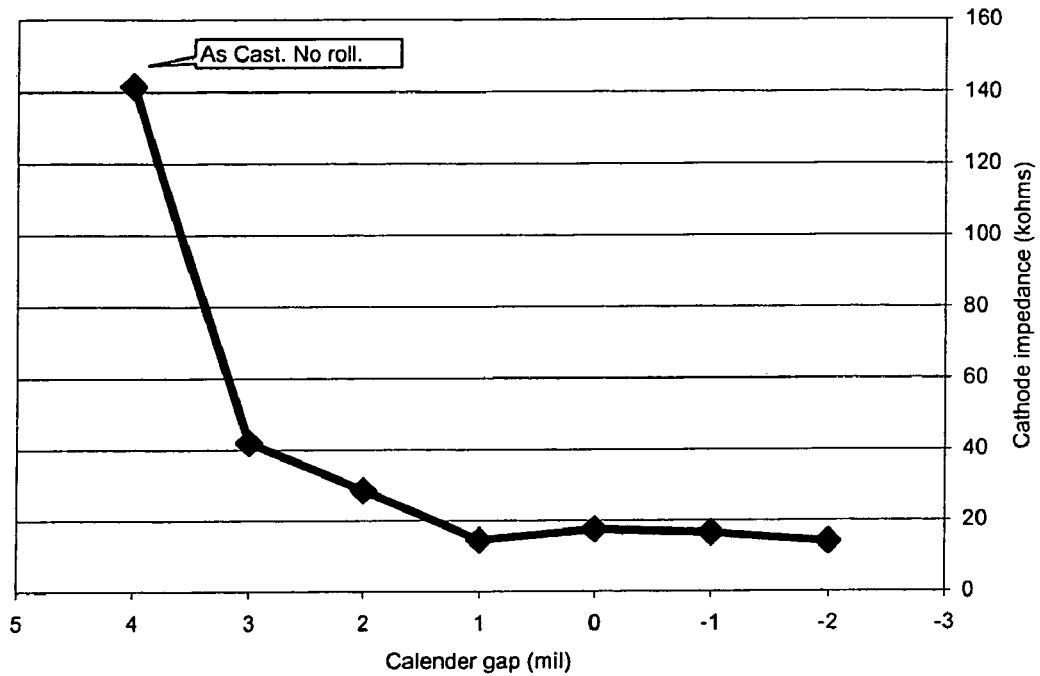
FIG. 19 is a graph showing the correlation between cathode impedance and roll gap.

Cathode impedance with different rolling (calendering) pressures (or gap) is shown in FIG. 19. The results indicate that the impedance decreases with increasing pressure (which increases with decreasing roller gap). However, there is no further decrease in impedance after the rolling gap decreased to below 1 mil.

The effect of particle size and composition on cathode adhesion and impedance was also investigated. From Batch c105, large particles have been used to cast cathode. The composition and substrate are summarized in Table 2.

TABLE 2

Sample Preparation Conditions

| Batch # | Substrate | Composition ($LiCoO_2$/PVA binder) |
|---|---|---|
| 105 | 2 Mil Al | 98/2 diluted |
| 106 | 2 Mil Al | 98/2 diluted, separated large particle |
| 107 | 2 Mil Al | 98/1 |
| 107a | 2 Mil Al coated with adcote | 98/1 |
| 108 | 2 Mil Al | Pure $LiCoO_2$ |
| 108a | 2 Mil Al coated with adcote | Pure $LiCoO_2$ |
| 109 | 2 Mil Al | 98/5 |
| 110 | 2 Mil Al | 95/5, added 2% carbon |
| 111 | 2 Mil Al | 95/5 |
| 111a | 2 Mil Al coated with adcote | 95/5 |
| 112 | Ni coated Al | 99/1 |
| 113 | Ni coated Al | Pure $LiCoO_2$ |

Figure 20:
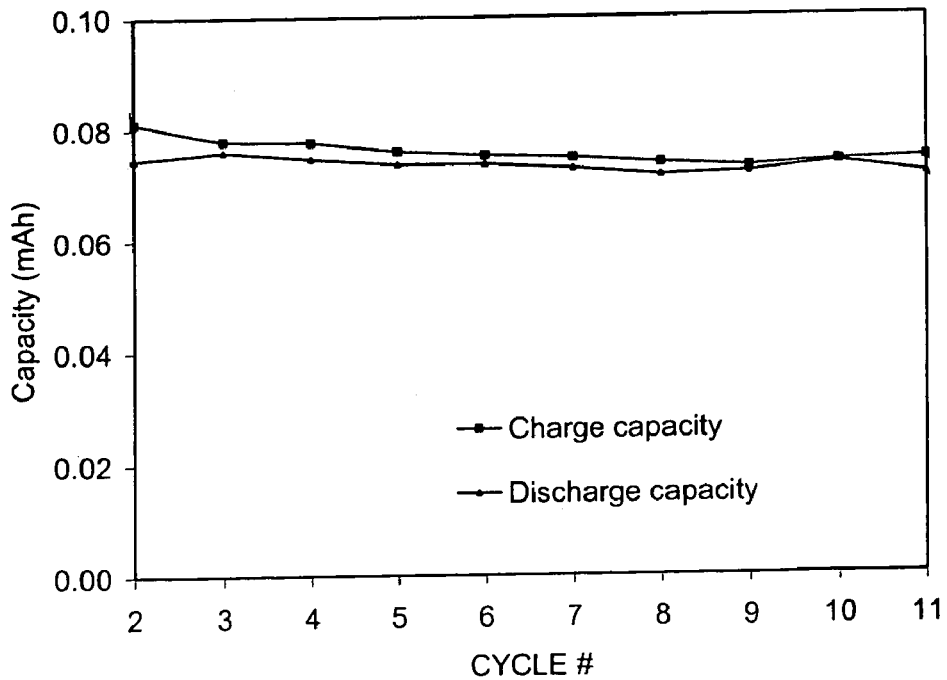
FIG. 20 is a graph showing capacity as a function of cycle number.

Pure $LiCoO_2$ gave poor adhesion on both Al and Ni coated Al after drying. Cathodes with 99/1 composition showed good adhesion on Al, but poor adhesion on Ni coated Al after drying at 80° C. overnight. All the cathodes cast on adcote coated Al substrate showed good adhesion after drying and rolling. However, initial impedances of all these samples were in the range of 3-6 kohms. Therefore, heat treatment is preferred to reduce the cell impedance. Cathodes (with the composition of 95/5) casting on Ni/Al substrates were heated at 450° C. for 1 hour. The cathode impedance dropped from 7 kohms to 1.2 kohms after annealing. The sample prepared with this cathode has demonstrated very good electrochemical properties which gave 75 uAh capacity and good reversibility. The charge and discharge capacity of the cell is shown in FIG. 20. The effective thickness of the cathode is 3 um, which is very close to the thickness measured by SEM.

Further investigation indicated that the sample impedance was reduced from 3-6 kohms (immediately after rolling) down to 300-600 ohms if it was annealed at 240-250° C. for only 2 minutes. The sample impedance increased dramatically if it was annealed at a temperature below 240° C. Tests show that this heat treatment condition (250° C.) can be easily achieved using an IR lamp over the substrates after they are mounted on the plates for the LiPON run. This will allow for a very short time between the annealing cycle and the start of the LiPON run to minimize the gradual rise in cathode impedance seen when substrates are allowed to sit after annealing.

Figure 21A:
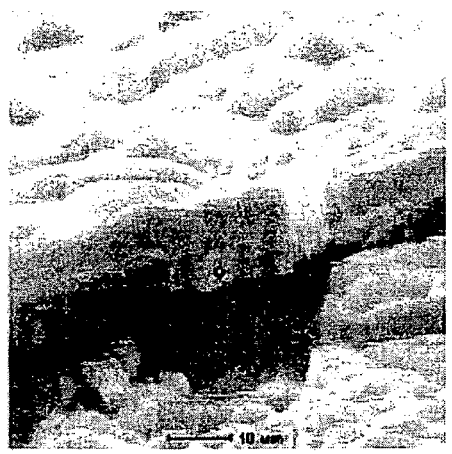
FIG. 21a is a copy of a photograph showing the cast cathode layer after being annealed and covered with a layer of electrolyte.
Figure 21B:
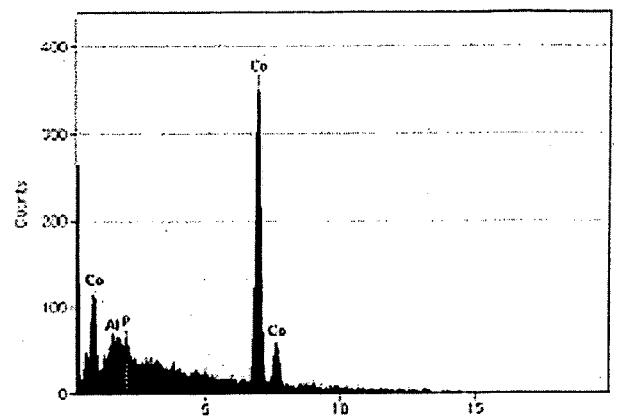
FIG. 21b is a graph showing phosphate diffusion.

To investigate the compatibility of the LiPON electrolyte and cathode films, $LiCoO_2$ powder (with an average particle size of 7 um) has been mixed with 5% of binder and 3% of conductive carbon to form a slurry. The cathode slurry was cast on a thin aluminum substrate using a doctor blade to achieve a film thickness of approximately 25 um. After heat treatment in a 120° C. oven overnight, a 5 um thick coating of LiPON was deposited on top of the cathode. A cross sectional view of the films was analyzed by Scanning Electron Microscopy as shown in FIG. 21*a*. It shows that the $LiCoO_2$ film was covered by a continuous LiPON film. FIG. 21*b* shows the EDX spectra of $LiCoO_2$ powder underneath LiPON film.

Figure 22A:
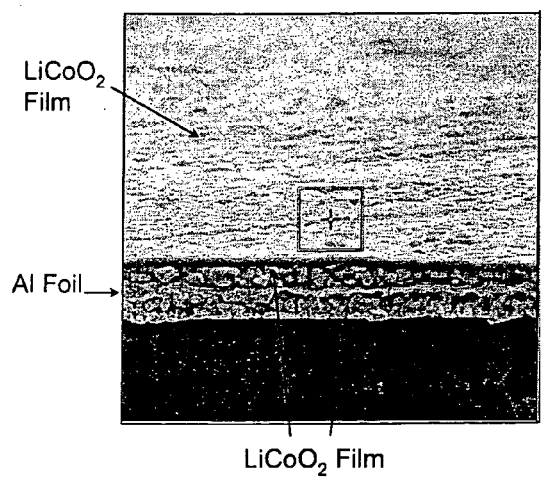
FIG. 22a is a copy of a photograph showing the cast cathode layer after being annealed and coated with an electrolyte.
Figure 22B:
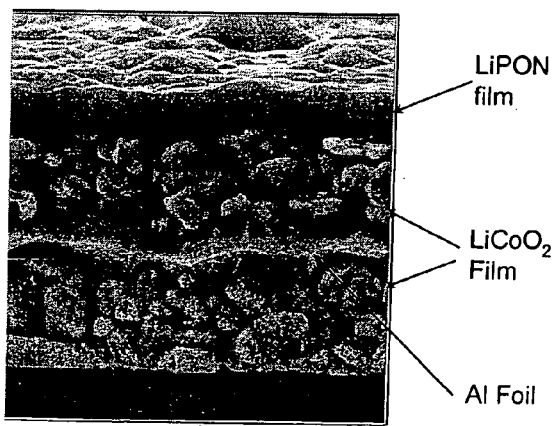
FIG. 22b is a copy of a photograph showing the cast cathode layer after being annealed and coated with an electrolyte.

A LiPON film has been deposited on the top of rolled $LiCoO_2$ cathode as shown in FIG. 22. FIG. 22 (*a*) shows a tilted view of LiPON film deposited on a $LiCoO_2$ cathode which has been cast on both sides of a 4 um thick Al foil. The figure indicates that LiPON has a very good surface coverage on cathode film. FIG. 22(*b*) shows a cross section of 2.5 um of LiPON coated on $LiCoO_2$ which gives further details of the cathode structure and LiPON coverage.

Figure 23:
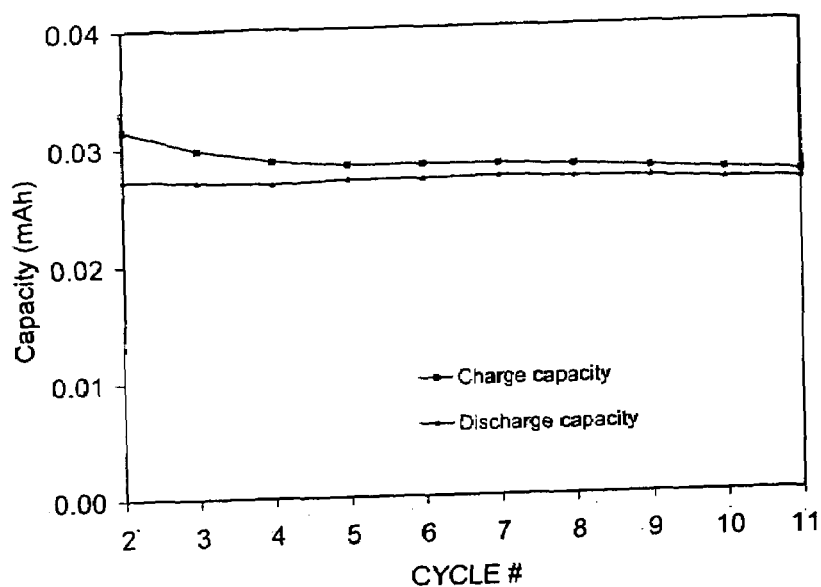
FIG. 23 is a graph showing the cycling of a cell.

A cast layer of $LiCoO_2$ with 1% binder was annealed to 550° C. for 5 hours. Although the sample showed some powdery nature when rubbed it appeared to be smooth and the layer was not flaking off. LiPON and Li were deposited and the cell cycled at 25 uA. It showed good cyclability and reasonable capacity. The C-rate capacity of 27 uAh is for an active area of 0.36 cm$^2$. This cast cell has a thickness of ~5-10 um and is cast from a mixture of fine (<1 um) and regular powder (~7 um). Cycling behavior of the cell is shown in FIG. 23. The sample capacity loss is minimal when cycling at C-rate.

Although the cells with low temperature annealed cathode demonstrate excellent cyclability, high temperature (550° C.) annealed samples show a better capacity because they can be 100% $LiCoO_2$ without any inactive materials (such binder which may prevent ion and electron transport in the absence of electrolyte).

Figure 24:
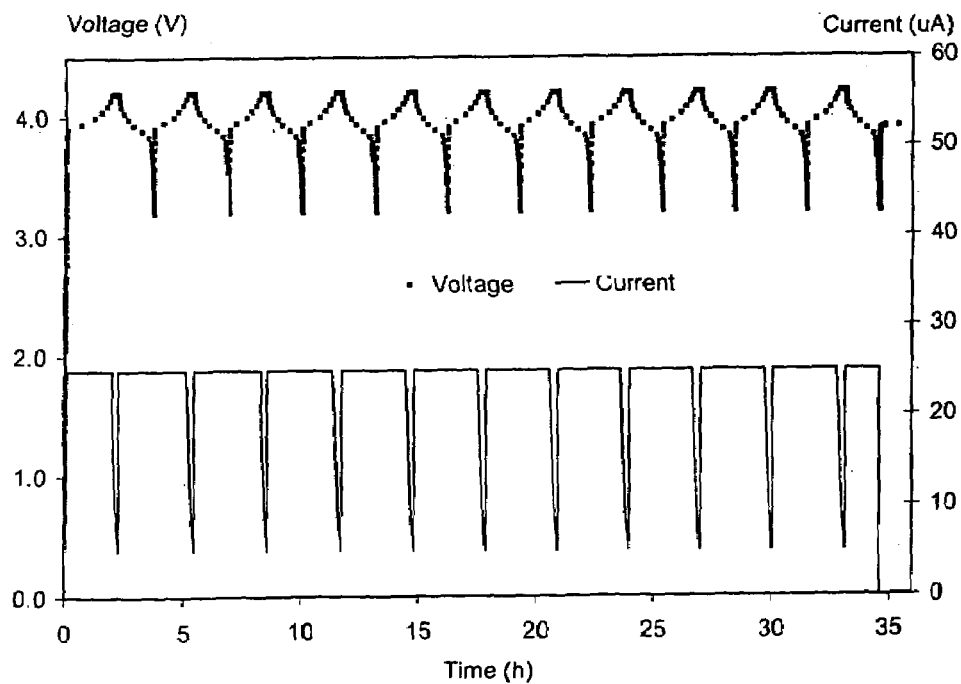
FIG. 24 is a graph showing the voltage profile of a sample.
Figure 25:
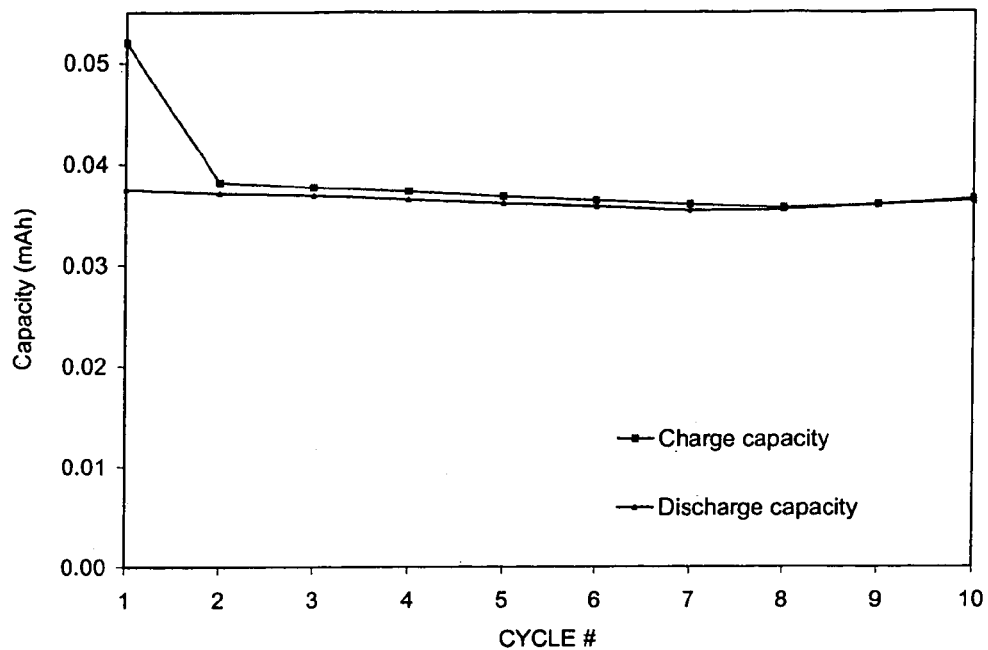
FIG. 25 is a graph showing the initial cycling curve of the sample shown in FIG. 24.
Figure 26:
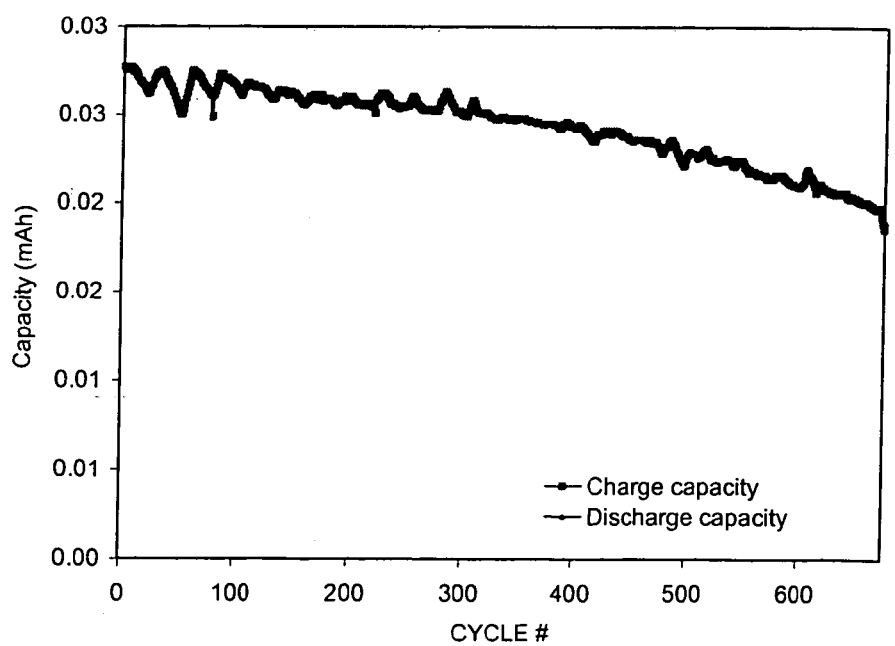
FIG. 26 is a graph showing the long-term cycling profile of a sample.

$LiCoO_2$ films have been cast with 5% LHB-108P binder. The mixed slurry was rolled overnight and ultrasonicated before casting on Au/Co coated 2-mil thick Ni substrate. Nickel substrate was treated at 700° C. for one hour to form a thin layer (approximately 2 microns) of insulation layer (NiO) before coated with 200 angstroms of cobalt and 2000 angstroms of gold. The films were then calendered in a stainless steel roller and annealed at 550° C. for 6 hours. About 2 um thick of LiPON was deposited on the top of $LiCoO_2$ film, and then about 2 um thick of lithium metal was thermally evaporated on the top of LiPON to complete the cell. The sample was cycled at a current density of 175 uAh/cm$^2$. Initial voltage profile of the sample fc1023b.001 and cycling curve are shown in FIGS. 24 and 25. The sample has been cycled for more than 600 cycles with a capacity fade of 3.9%/100 cycles as shown in FIG. 26.

Figure 27:
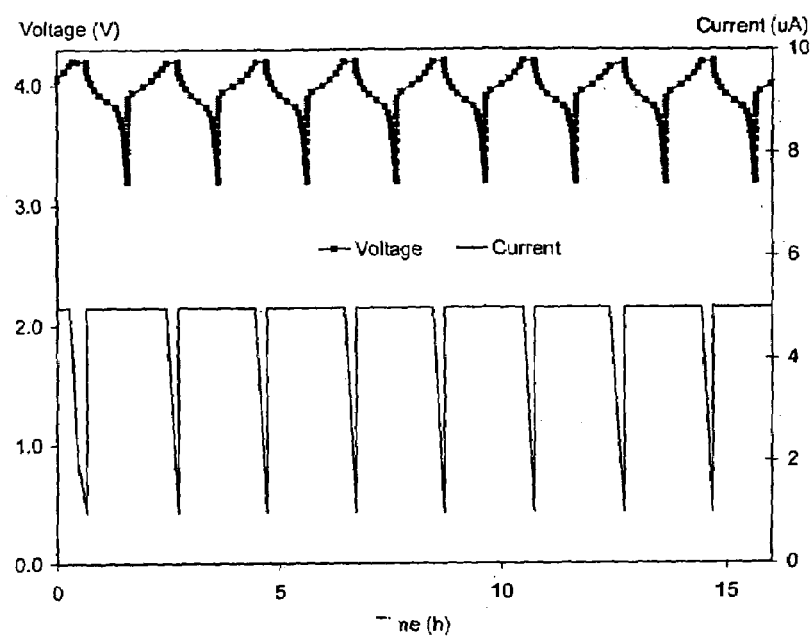
FIG. 27 is a graph showing the voltage profile of a sample.
Figure 28:
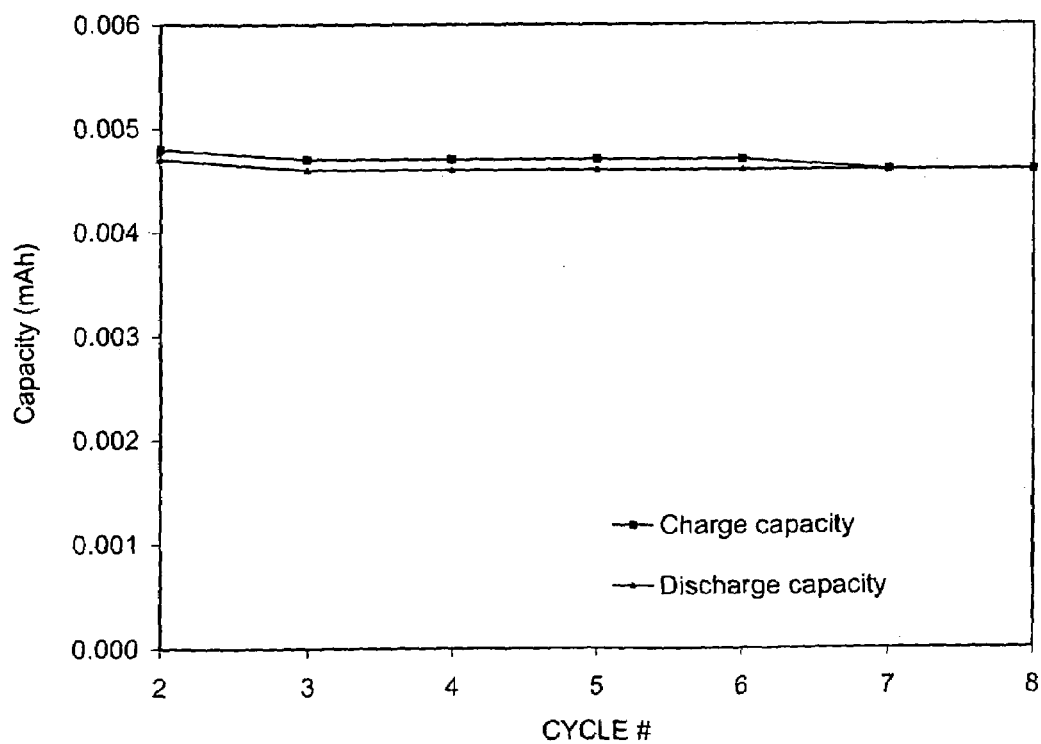
FIG. 28 is a graph showing the initial cycling curve of the sample shown in FIG. 27.

In another test, $LiCoO_2$ films have been cast with 5% PVA binder. The mixed slurry was rolled overnight and cast on Ni coated 2 mil thick Al substrate. The films were then calendered in a stainless steel roller and annealed at 630° C. for 6 hours. About 2 um thick of LiPON was deposited on the top of $LiCoO_2$ film, and then about 2 um thick of lithium metal was thermally evaporated on the top of LiPON to complete the cell. The sample was cycled at a current density of 12.5 uAh/cm$^2$. Initial voltage profile of the sample fc1005lc.008 and its cycling curve are shown in FIGS. 27 and 28.

The analysis indicated that thin film batteries with cast $LiCoO_2$ could have excellent cycling stability. Sample #4 has been tested for more than 1000 cycles with a capacity loss of approximately 2.1%/100 cycles. Sample fc1023b.001 has been cycled for more than 600 cycles with a capacity loss of approximately 3.9%/100 cycles. The effective thickness of $LiCoO_2$ layer (assuming a standard capacity of 70 uAh/cm$^2$/um) varied from 0.04 um to 4.82 um. This means that only the $LiCoO_2$ adjacent to the LiPON layer has been utilized in the cell charge/discharge process, although this process is very stable and has minimum capacity fade.

The correlation between different characteristics of cells has been analyzed. It is found that the capacity fade of the cell decreased with increasing Coulomb efficiency of the cells, but the capacity fade is not directly related to the current density of the cells, i.e., the cells prepared in the right conditions, such as cast on Au/Co coated 2-mil thick Ni foil and annealed at 550° C., can be discharge at high current but still exhibit minimum capacity fade. The samples with smaller resistance always have smaller capacity fade. The large capacity cells (which have a larger effective thickness) always have a smaller resistance.

A hybrid approach for the production of thin film batteries has been developed wherein ultra thin film $LiCoO_2$ films are coated on a thin aluminum substrate by a wet, slurry casting method. A solid-state electrolyte, LiPON film, and anode (lithium metal film) are deposited by sputtering and thermal evaporation, respectively. The samples prepared by this technology have been cycled for more than 600 cycles with a capacity loss of approximately 3.9%/100 cycles. The area capacity of the thin film battery has reached 338 u Ah/cm$^2$, which corresponds to an effective thickness of 4.82 um. This is very close to the theoretical capacity of the cathode.

A systematic study has been performed to identify the best preparation conditions for thin film batteries. In the initial experiment, most of samples were annealed at 250° C. The experiment results indicate that addition of ionic glass and carbon additive can increase ionic and electronic conductivity of cathode. Although the batteries with 250° C. annealed cathode exhibit excellent cyclability, their capacities were significantly limited by the existence of the binder. After removing the binder by high temperature (from 450 to 600° C.) annealing, samples demonstrate much higher capacity than those annealed at lower temperature. Further analysis of experiment data finds that the capacity of most samples corresponds to the capacity of single layer $LiCoO_2$ particles. This indicates that only the first $LiCoO_2$ layer adjacent to LiPON film participates in the charge/discharge process of these batteries. Therefore, a 5-7 u m thick of $LiCoO_2$ film (which corresponds to average particle size of $LiCoO_2$) will be the ideal thickness for the cathode. The samples with smaller resistance always have larger capacity and smaller capacity fade.

It should be understood that other lithium intercalation compounds, such as lithium nickel oxide, lithium manganese oxide, vanadium oxide, vanadium pent-oxide, and lithium iron phosphate, may be used as an alternative to the lithium cobalt oxide cathode material.

It thus is seen that a method of producing a thin film battery cathode is now provided which is efficient and cost effective. It should of course be understood that many modifications may be made to the specific preferred embodiment described herein, in addition to those specifically recited herein, without departure from the spirit and scope of the invention as set forth in the following claims.

The invention claimed is:

1. A method of producing a thin film battery cathode comprising the steps of:
   (A) providing a mass of powdered cathode material;
   (B) providing a substrate;
   (C) forming a liquid slurry with the cathode material;
   (D) casting the liquid slurry upon the substrate;
   (E) drying the liquid slurry to form a layer of cathode material;
   (F) compressing the cathode layer to a generally uniform thickness; and
   (G) heating the cathode layer to at least 250 degrees Celsius.

2. The method of claim 1 wherein step (A) said powdered cathode material has a mean particle size of between 5 and 12 microns.

3. The method of claim 2 wherein step (F) the cathode layer is compressed to a thickness of between 5 and 12 microns.

4. The method of claim 1 wherein step (A) the powdered cathode material is selected from the group consisting of lithium cobalt oxide, lithium nickel oxide, lithium manganese oxide, vanadium oxide, vanadium pent-oxide, lithium iron phosphate and other lithium intercalation compounds.

5. The method of claim 1 wherein step (C) the slurry also include a binder.

6. The method of claim 5 wherein step (S) the cathode layer is heated to at least 500 degrees Celsius.

7. The method of claim 5 wherein step (G) the cathode layer is heated to a temperature wherein the peripheral edges of the cathode powder sinters to each other.

8. The method of claim 1 wherein step (F) the cathode layer is compressed by passing it between rollers.

9. The method of claim 1 wherein step (B) the substrate is selected from the group consisting of aluminum, aluminum coated with cobalt and gold, nickel coated with gold, nickel, platinum, and stainless steel.

10. The method of claim 1 wherein step (F) the cathode layer is compressed to a thickness of between 5 and 12 microns.

11. A method of producing a thin film battery cathode comprising the steps of:
 (A) providing a mass of powdered cathode material having a mean particle size of between 5 and 12 microns;
 (B) forming a liquid slurry with the cathode material;
 (C) casting the liquid slurry upon a substrate;
 (D) drying the liquid slurry to form a layer of cathode material;
 (E) compressing the cathode layer to a generally uniform thickness of between 5 and 12 microns, and
 (F) heating the cathode layer to at least 250 degrees Celsius.

12. The method of claim 11 wherein step (F) the cathode layer is heated to a temperature wherein the peripheral edges of the cathode powder sinters to each other.

13. The method of claim 11 wherein step (F) the cathode layer is heated to at least 500 degrees Celsius.

* * * * *